United States Patent [19]
Yokouchi et al.

[11] Patent Number: 4,790,144
[45] Date of Patent: Dec. 13, 1988

[54] DEFROSTING CONTROL APPARATUS FOR A TEMPERATURE CONTROL SYSTEM

[75] Inventors: Akira Yokouchi, Kusatsu; Katsumi Fukuda, Shiga; Keiichi Kuriyama, Kusatsu; Makoto Kaibara, Otsu; Masahiro Watanabe, Kusatsu, all of Japan

[73] Assignee: Matsushita Electric Industrial Co., Ltd., Osaka, Japan

[21] Appl. No.: 930,754

[22] Filed: Nov. 14, 1986

[30] Foreign Application Priority Data

| Nov. 18, 1985 [JP] | Japan | 60-258002 |
| Nov. 18, 1985 [JP] | Japan | 60-258003 |
| Nov. 18, 1985 [JP] | Japan | 60-258005 |
| Jan. 24, 1986 [JP] | Japan | 61-14021 |

[51] Int. Cl.⁴ .............................................. F25D 21/06
[52] U.S. Cl. ........................................ 62/156; 62/158
[58] Field of Search ............... 62/155, 156, 140, 160, 62/157, 158, 234, 128

[56] References Cited

U.S. PATENT DOCUMENTS 4,299,095 11/1981 Cassarino .......................... 62/156 X

FOREIGN PATENT DOCUMENTS

| 008733 | 7/1981 | Japan | 62/156 |
| 59-34255 | 1/1984 | Japan | |
| 0093138 | 5/1984 | Japan | 62/155 |
| 0200145 | 11/1984 | Japan | 62/155 |

Primary Examiner—Harry B. Tanner
Attorney, Agent, or Firm—Spencer & Frank

[57] ABSTRACT

In a temperature control system when can be operated as a heat pump, frost deposited onto an outdoor heat exchanger (evaporator) is detected by a change in temperature of the refrigerant which flows into an indoor heat exchanger (condenser), so that a sensor to detect the deposition of the frost need not be attached to the outdoor heat exchanger. The refrigerant temperature is measured at the inlet of the indoor heat exchanger, and the temperature control system is switched to defrosting operation on the basis of this temperature and various elapsed time periods if the actual heat capability of the incoming refrigerant is insufficient, detecting the temperature of the refrigerant on the inlet side of the indoor heat exchanger, namely, by detecting the temeprature at a single position. Therefore, there is no need to use the frost deposition sensor on the outdoor side, frost deposition discriminating circuit by the signal of this sensor, signal lines to connect the frost deposition discriminating circuit with the main control circuit and the like which are provided in the room, and the like, so that the circuit can be simplified.

7 Claims, 8 Drawing Sheets

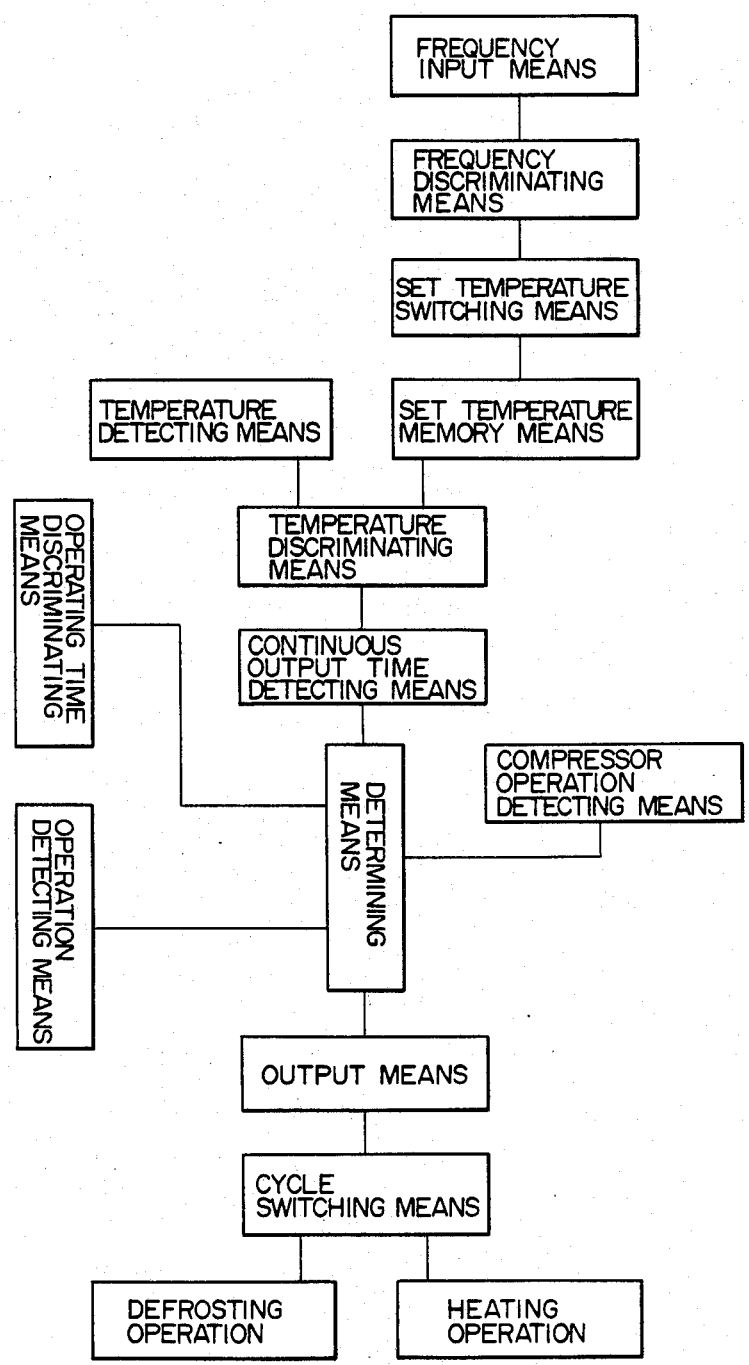
F I G. 1

F I G. 2
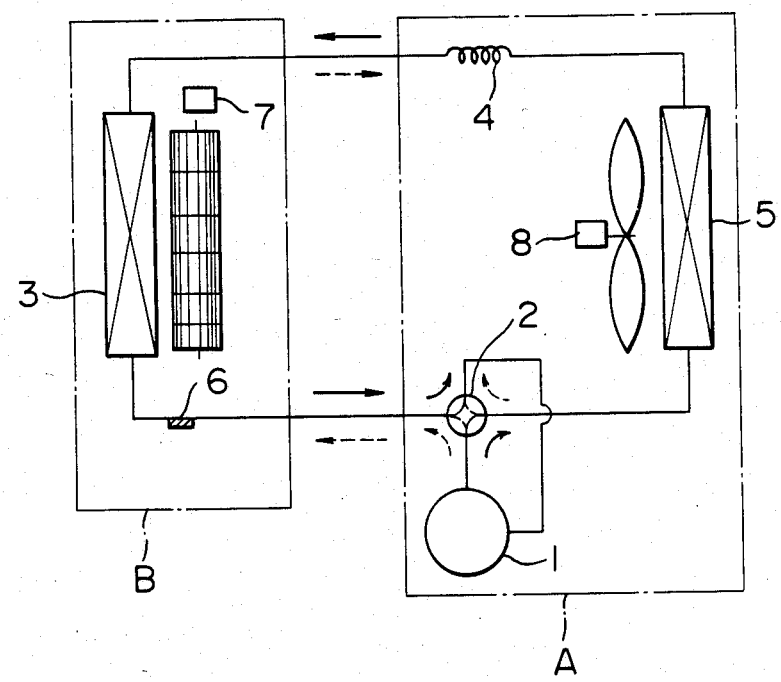

DEFROSTING CONTROL APPARATUS FOR A TEMPERATURE CONTROL SYSTEM

BACKGROUND OF THE INVENTION

The present invention relates to a defrosting control apparatus for a temperature control system, such as an air-conditioner or heat pump.

Hitherto, as disclosed in JP-B 59-34255, the frosting state of an outdoor heat exchanger has been detected on the basis of both a change in temperature of an indoor heat exchanger and a change in room temperature, and the heating and defrosting operations have been controlled in accordance with the frosting state detected.

However, such a conventional arrangement has the problems that a plurality of temperature sensors are necessary and the circuit obviously becomes complicated. Further, in the temperature control system, since generally the amount of air blown on the indoor side is arbitrarily and variably set, the addition of a wind amount correcting means to the conventional technique causes the circuit to be further complicated. Moreover, in such a conventional arrangement, the temperature of the gas-liquid mixture refrigerant flowing in the heat exchanger is detected. Therefore, the change in the temperatures in the frosting and non-frosting conditions is small and the frosting state must be discriminated within a very narrow temperature range, and this causes the problem such that the detection accuracy is unstable.

In recent years, in many cases, complicated signal processing is performed by a microcomputer as part of a control apparatus. However, the use of many input signal sources (temperature sensors) as in the conventional technique becomes an obstacle in making the program, and there is also a limit in how far the program can be simplified. In addition, the rotational speed of the compressor varies depending on the difference in frequency of the power source, namely, in the cases of 50 Hz and 60 Hz, causing a difference in capability of the refrigerating cycle. Therefore, the temperature of the indoor heat exchanger changes. For example, the rotational speed of the compressor at 60 Hz is higher than that at 50 Hz and the capability of the refrigerating cycle is also larger than that at 50 Hz. Therefore, in general, the temperature of the indoor heat exchanger increases, so that there is the problem that the defrosting operation may not be started although it is necessary to perform the defrosting operation on the outdoor heat exchanger.

The conventional technique has many problems as mentioned above, and further improvement is required.

SUMMARY OF THE INVENTION

It is an object of the present invention to permit the deposition of frost onto the outdoor heat exchanger to be detected on the indoor side associated with the room in which the temperature is controlled, thereby making it possible to certainly determine the necessity of the defrosting operation and to simplify the control circuit and the like.

Another object of the invention is to inibit the defrosting operation for a constant period of time after the start of the heating operation when the operation start switch is turned on, and after the start of the heating operation due to the completion of the defrosting operation, thereby enabling the heating operation to be continued and enabling the heating effect to be assured for an initial period of time at the start of the operation.

Still another object of the invention is to inhibit the defrosting operation for a constant period of time after the restart of the compressor after the compressor has once been stopped due to the room temperature control, thereby enabling the heating operation to be continued and enabling the heating effect to be assured when the compressor is restarted.

Still another object of the invention is to execute the defrosting operation when the temperature of the refrigerant is continuously lower than a set value for a constant period of time, thereby preventing improper operation due to an instantaneous signal such as external noise or the like and enabling reliability to be assured.

As shown in FIG. 1, according to the present invention, a control apparatus for switching between a heating cycle and a defrosting cycle comprises: operating time detecting means for detecting the elapse of a set time after the start of the heating operation and for outputting the result of the detection; compressor operation detecting means for determining whether a compressor has operated for a predetermined time or not after the elapse of the set time by the operation time detecting means; temperature detecting means for detecting the temperature of a pipe at the refrigerant inlet side of an indoor heat exchanger; set temperature memory means in which a boundary value temperature at which the heating cycle is switched to the defrosting cycle is stored; frequency input means for outputting the frequency of a power source; frequency determining means for discriminating whether the input frequency provided by the frequency input means is 50 Hz or 60 Hz; set temperature switching means for switching the boundary value temperature stored in the set temperature memory means in response to the output of the frequency discriminating means; temperature discriminating means for detecting whether the temperature detected by the temperature detecting means is lower than the boundary value temperature stored in the set temperature memory means and for outputting the result of the detection; continuous output detecting means for detecting whether the boundary value temperature reduction signal by the temperature discriminating means is continuously output for a time longer than a set time and for outputting the result of the detection; operation detecting means for detecting whether the compressor is operating when the boundary value temperature reduction signal is output from the continuous output detecting means and for outputting the result of the detection; determining means for respectively receiving the outputs from the operating time detecting means, compressor operation detecting means, temperature discriminating means, continuous output detecting means, and operation detecting means, thereby determining whether the operating cycle is set to the heating cycle or the defrosting cycle; and output means for driving cycle switching means in response to the output of the the determining means.

With this construction, the heating cycle can be switched to the defrosting cycle by the cycle switching means when it is detected by the compressor operation detecting means that the compressor is operating after the elapse of the set time by the operation time detecting means, and when it is determined by the continuous output detecting means that the boundary value temperature reduction signal according to the power source frequency by the temperature discriminating means continues for a time longer than the set time, and when the detection signal indicating that the compressor is operating is output from the operation detecting means in the case where the boundary value temperature reduction signal is output from the continuous output detecting means.

BRIEF DESCRIPTION OF THE DRAWINGS

FIG. 1 is a block diagram showing a defrosting control apparatus in accordance with the present invention by function realizing means;

FIG. 2 illustrates a temperature control system which employs an embodiment of the invention;

DESCRIPTION OF THE PREFERRED EMBODIMENTS

Figure 3:
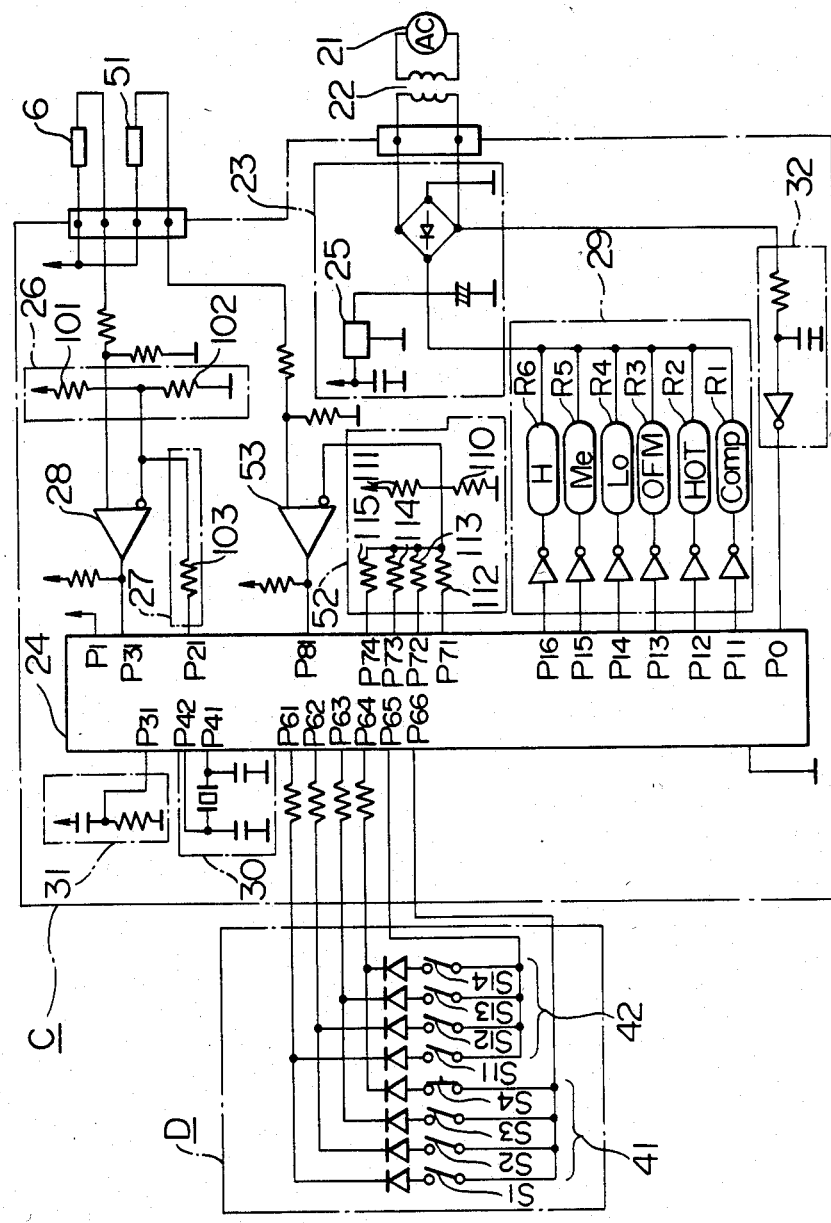
FIG. 3 is a circuit diagram of the defrosting control apparatus in the temperature control system.

A practical construction of the present invention will be described hereinbelow with reference to FIGS. 2 to 5.

FIG. 2 is a diagram of a temperature control system which employs an embodiment of the invention.

In this diagram, the system is constituted by sequentially coupling a compressor 1, a four-way change-over valve 2, an indoor heat exchanger 3, a decompressor or expansion device 4, and an outdoor heat exchanger 5 on which frost may form. A pipe temperature sensor 6 is attached to a pipe which serves as the refrigerant inlet of the indoor heat exchanger 3 (condenser) during the heating operation. The refrigerant flows in the direction indicated by solid line arrows in the diagram during the refrigerating operation. The refrigerant flows in the direction indicated by broken line arrows in the diagram during the heating operation since the four-way change-over valve 2 is switched.

Further, an outdoor unit A is constituted by the compressor 1, four-way change-over valve 2, expansion device 4, outdoor heat exchanger 5, and an outdoor blower 8. On the other hand, an indoor unit B is constituted by the indoor heat exchanger 3, an indoor blower 7, pipe temperature sensor 6, and an operation control unit (not shown) having a microcomputer in which the timer function, temperature control function, and the like are programmed. The sensor 6 is attached where it is not influenced by the air flow of the indoor blower 7. The sensor 6 may be also disposed at a location near the indoor unit B.

An operation control circuit will now be described with reference to FIG. 3, in which the same parts and components as those shown in FIG. 2 are designated by the same reference numerals.

In FIG. 3, C denotes an operation control unit and D represents a remote control unit (hereinafter, referred to as an operation unit). The operation control unit C comprises: a transformer 22 to step down the power source voltage of an AC power source 21; a DC power source generating unit 23 to convert the AC voltage to a DC voltage; a regulator 25 to supply a DC voltage from the DC power source generating unit 23 to a microcomputer (hereinafter, referred to as an LSI) 24 as an input power source; a reference voltage generator 26; a defrosting setting circuit 27 to set an operating temperature for switching to defrosting; a comparator 28 to compare a combined input provided by the reference voltage generator 26 and the defrosting setting circuit 27 with an input from the pipe temperature sensor 6; an output circuit 29 consisting of a group of relay elements to control operation of each of the compressor 1, four-way change-over valve 2, indoor blower 7, and outdoor blower 8; an oscillator 30 to form reference timing signals for various kinds of signal processing by the LSI 24; and a resetting circuit 31 to perform various signal processes. The regulator 25 is connected to a port $P_1$ of the LSI 24 and the output circuit 29 is connected to ports $P_{11}$ to $P_{16}$, respectively. The defrosting setting circuit 27, to decide the operating temperature point at which the operating mode is switched from the heating operation to the defrosting operation, is connected to a port $P_{21}$. The comparator 28 is connected to a port $P_{31}$. The oscillator 30 is connected to ports $P_{41}$ and $P_{42}$. The resetting circuit 31 is connected to a port $P_{51}$.

Full-wave rectified current from a diode bridge in the DC power source generating unit 23 is converted into a clock signal by an circuit 32. This frequency signal is input to a port $P_0$. In response to the frequency signal, if it is determined that the frequency of the commercially available power source is 60 Hz a 50/60 Hz discriminating means provided in the LSI 24, a Hi (high-level) signal is output from the port $P_{21}$, thereby influencing the reference voltage provided by reference voltage generator 26.

The generator 26 consists of resistors 101 and 102. The defrosting setting circuit 27 consists of a resistor 103 connected to the port $P_{21}$. The output circuit 29 consists of relay elements $R_1$ to $R_6$ connected to the respective ports $P_{11}$ to $P_{16}$. The relay element $R_1$ corresponds to the compressor 1 (FIG. 1). The relay element $R_2$ corresponds to the four-way change-over valve 2. The relay element $R_3$ corresponds to the outdoor blower 7. The relay elements $R_4$ to $R_6$ correspond to "low speed", "middle speed", and "high speed" terminals to control the amount of air blown by the indoor blower 7.

Reference numeral 51 denotes an air temperature sensor to detect the temperature of suction air (that is, air drawn to blower 7); 52 denotes a D/A converter having a plurality of resistors 110 to 115; and 53 denotes a comparator for comparing the input signal from the sensor 51 with the input signal from the D/A converter 52, thereby outputting an operation start-stop signal to the compressor 1 to make the compressor operative or inoperative.

The sensor 51 and D/A converter 52 function as a thermostat to control the temperature in the room. The D/A converter 52 is connected to ports $P_{71}$ to $P_{74}$ of the LSI 24. The output of the comparator 52 is connected to a port $P_{81}$ of the LSI 24. Since the control of the room temperature is not directly concerned with the essence of the invention, its detailed description is omitted.

The operation unit D comprises: an air velocity change-over operation unit 41 having selection switches $S_1$ to $S_4$ for "low speed", "middle speed", "high speed", and "stop"; and a room temperature setting operation unit 42 having switches $S_{11}$ to $S_{14}$ to set the room temperature. The operation units 41 and 42 are connected to ports $P_{61}$ to $P_{66}$ of the LSI 24, respectively. When the operation units 41 and 42 are set, corresponding control signals are provided to LSI 24, so that the output circuit 29 and the circuit sections concerned with the room temperature control are made operative.

The relation between the foregoing arrangement and the arrangement shown in FIG. 1 will be further described.

The pipe temperature sensor 6 corresponds to the temperature detecting means. The reference voltage generator 26 corresponds to the set temperature memory means. The defrosting setting circuit 27 corresponds to the set temperature switching means. The inverter circuit 32 corresponds to the frequency input means. The comparator 28 corresponds to the temperature discriminating means. The output circuit 29 corresponds to the output means. The oscillator 30 makes a fundamental operation timing signal for the LSI 24. The LSI 24 performs the operations corresponding to the operation time detecting means, continuous output detecting means, operation detecting means, and compressor operation detecting means. Further, the LSI 24 also corresponds to the frequency discriminating means and the determining means for determining whether the operating mode is the defrosting operation or the heating operation.

The operation from the start of the heating operation until the defrosting operation is performed will now be described with reference to FIGS. 2 to 5.

Assuming that the temperature of discharge refrigerant from the compressor 1 is Td, the temperature of suction refrigerant into the compressor 1 is Ts, the discharge pressure of the compressor 1 is Pd, the suction pressure of the compressor 1 is Ps, and a polytropic index is n (in this case, there is the relation of $1<n<k$ and k is an adiabatic compression index), the discharge refrigerant temperature Td is expressed by the following expression.

$$Td = Ts \cdot \left(\frac{Pd}{Ps}\right)^{\frac{n-1}{n}}$$

Figure 4:
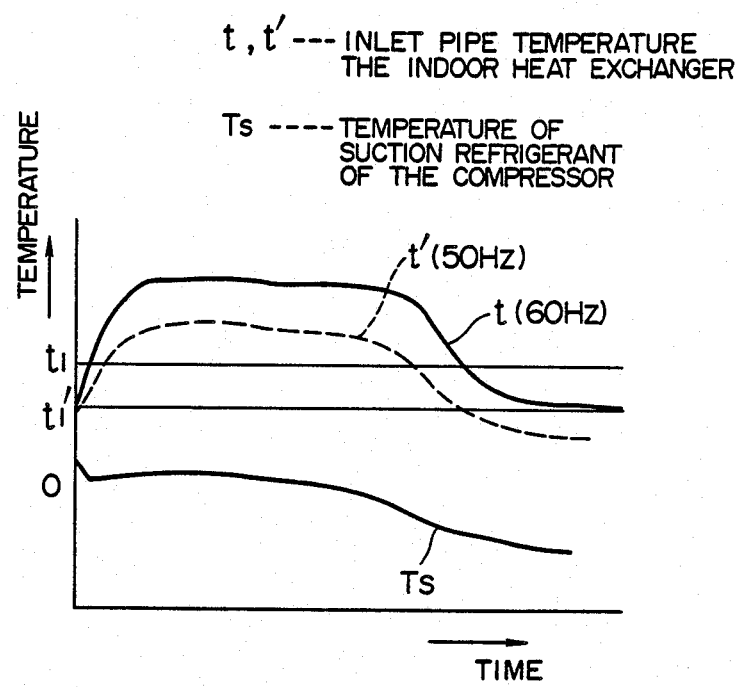
FIG. 4 is a characteristic diagram showing the relation between the temperature of refrigerant flowing into the indoor heat exchanger in the defrosting control apparatus and the temperature of suction refrigerant into the compressor.

Therefore, when no frost is deposited on the outdoor heat exchanger 5, the suction refrigerant temperature Ts and discharge refrigerant temperature Td are high as shown in FIG. 4. As the deposition of the frost increases, the values of both Ts and Td decrease. The pipe temperature sensor 6 in the invention is attached to a pipe at the inlet of the indoor heat exchanger 3 and detects the temperature of the portion of the pipe in which the high-temperature and high-pressure refrigerant gas in the overheat range emitted from the compressor 1 flows. However, this temperature, indeed, is lower than the real temperature of the discharge gas by a predetermined value because of the thermal loss by the internal and external connecting pipes and the like.

Therefore, as shown in FIG. 4, when no frost is deposited on the outdoor heat exchanger 5, both of the suction refrigerant temperature Ts of the compressor 1 and the temperature t of the inlet pipe of the indoor heat exchanger 3 are high. As the deposition of the frost increases, the temperatures Ts and t gradually decrease. When the frost is deposited at a level high enough to remarkably reduce the heating capability, the inlet pipe temperature t of the indoor heat exchanger 3 decreases extremely. Namely, if the temperature t is below a set pipe temperature $t_1$, the heating capability deteriorates and this means that a fairly large amount of frost has been deposited. Therefore, the outdoor heat exchanger 5 needs to be defrosted.

As mentioned above, since the inlet pipe temperature t of the indoor heat exchanger 3 is the temperature of the refrigerant gas in the overheat range, it is hardly influenced by the air blown by the indoor blower 7. Therefore, the necessity of the defrosting operation can be properly decided on the basis of the inlet pipe temperature of the indoor heat exchanger 3.

Further, since the rotational speed of the compressor 1 is almost proportional to the power source frequency (50 Hz or 60 Hz) the value of the high pressure of the refrigerating cycle in the case of 60 Hz operation is greater than that during 50 Hz operation. Therefore, it is assumed that the solid line portion t in FIG. 4 indicates the inlet pipe temperature of the indoor heat exchanger in the case of 60 Hz operation, the broken line portion t′ denotes the temperature in the case of 50 Hz operation. If the defrosting operation is always started on the basis of only the temperature $t_1$, in the case of 50 Hz operation, the defrosting operation will be started in spite of the fact that the deposition of the frost is still small, resulting in a deterioration of the heating efficiency. In the case of 50 Hz operation, therefore, the defrosting start temperature of the inlet pipe of the indoor heat exchanger is set to $t_1'$, thereby enabling the optimum defrosting operation to be performed.

Figure 5:
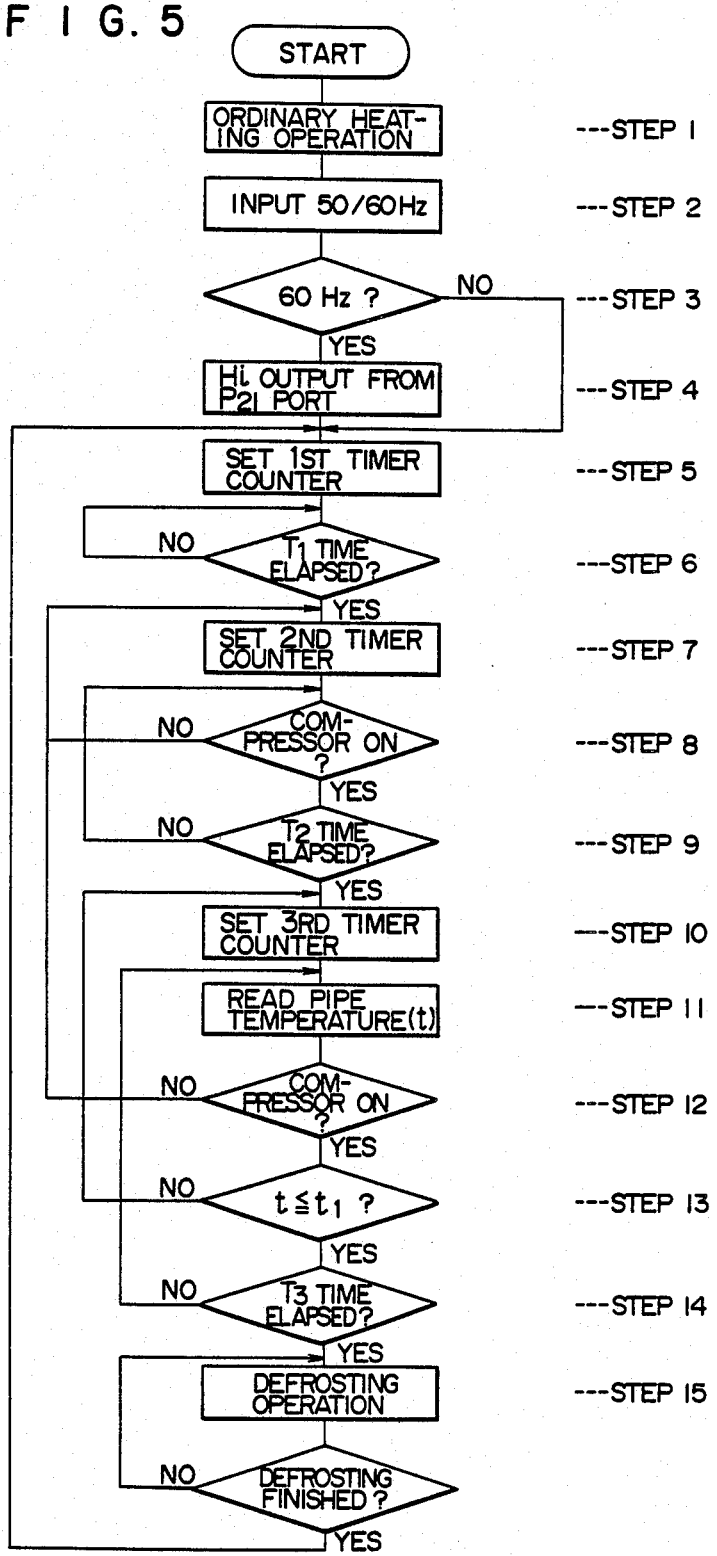
FIG. 5 is a flowchart showing the content of the operation of the defrosting control apparatus.

The control circuit shown in FIG. 3 executes control in accordance with the flow chart shown in FIG. 5 on the basis of the foregoing description.

For convenience of explanation, it is assumed that in the heating operation, the relay elements $R_1$ to $R_4$ for the compressor 1, four-way change-over valve 2, outdoor blower 8, and "low speed" operation of indoor blower 7 are in the operative states, respectively.

Namely, when the ordinary heating operation is started in step 1 and the power source frequency is input in step 2, a check is made to see if the frequency is 50 Hz or 60 Hz in step 3. If it is 60 Hz, a Hi signal is output from the port $P_{21}$ to raise the set value for the pipe temperature (step 4). A first timer counter counts a predetermined time $T_1$ (step 5). This timer count set is performed in order to ensure execution of the heating operation (subject to interruption by thermostatic control if the room temperature becomes undesirably high) the period of time $T_1$ (e.g., one hour) after the heating operation was started. It is one of the means for raising the heating efficiency to force continuous performance of the heating operation for the period of time $T_1$ irrespective of minor fluctuations. This time period $T_1$ is referred to as the defrosting inhibition time.

As shown in step 6 LSI 24 makes a check to see if the defrosting inhibition time $T_1$ has elapsed or not. The heating operation is continued until the time $T_1$ elapses.

After the elapse of the time $T_1$, a second timer counter is set to a time $T_2$ (e.g., about four minutes) in step 7. A check is then made by the LSI 24 to see if the compressor 1 is operating or not in step 8. If NO, the processing routine is returned to step 7 and the second timer counter is reset.

If YES in step 8, a check is made in step 9 to see if the time $T_2$ has elapsed or not. Namely, in steps 7 to 9, a check is made to see if the compressor 1 has continuously been operated for the set period of time $T_2$ or not. This time period $T_2$ is referred to as an operation detecting time.

If it is determined that the compressor 1 has continuously been operated for the time $T_2$ set by the second timer counter, a third timer counter is set in step 10. The pipe temperature t detected by the pipe temperature sensor 6 is read in step 11. A check is again made in step 12 to see if the compressor 1 is operating or not.

In the next step 13, a check is made to see if the pipe temperature t is below the set pipe temperature $t_1$ as the boundary value temperature at which the operating mode is switched from the heating operation to the defrosting operation or not. This discriminating step is performed by in practice the comparator 28 in FIG. 3.

If YES in step 13, namely, if $t_1$ is equal to or higher than t, a check is made in step 14 to see if a period of time $T_3$ (about one minute) set by the third timer counter has elapsed or not. This time period $T_3$ is referred to as the low-level time. The heating operation is continued until the time $T_3$ elapses. If the pipe temperature t becomes higher than the set pipe temperature $t_1$ before the low-level time $T_3$ elapses, the processing routine is returned to step 10 and the third timer counter is reset.

If YES in step 14, the defrosting operation is started in step 15. Namely, the relay elements $R_1$ to $R_4$ of the output circuit 29 shown in FIG. 3 operate, respectively, and the four-way change-over valve 2 is switched, the compressor 1 is stopped for a constant time as necessary before the defrosting operation is started, and the indoor blower 7 and outdoor blower 8 are stopped. The defrosting operation is performed in the refrigerating cycle. After completion of the defrosting operation, the processing routine is returned to step 5. Since the defrosting operation has conventionally been well known, the detailed description is omitted. As is well known hitherto, the operating mode can be returned to the heating operation by proper means by detecting the temperature, elapse of the set time, or the like.

The practical effects of the foregoing control procedure will now be explained together with the mutual relations among the variation in inlet pipe temperature, variation in room temperature, and operating state of the compressor.

Figure 6:
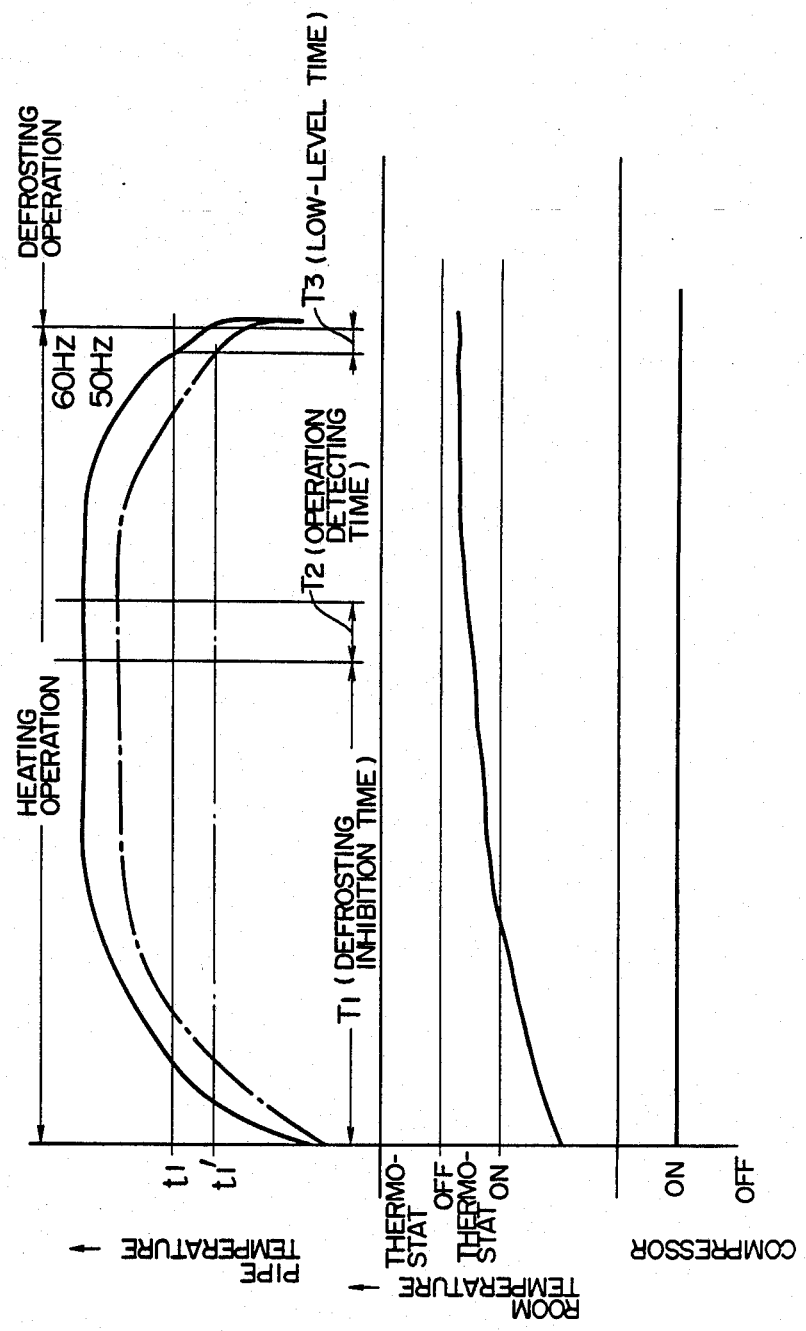
FIG. 6 is a time chart showing an example of the operation when the heating load on the temperature control system is large.

FIG. 6 shows the case where the compressor is driven at the power source frequency of 60 Hz and the load is very large (i.e., the outdoor temperature is very low). In this case, the compressor rotates simultaneously from the start of the operation. The inlet pipe temperature of the indoor heat exchanger increases and the room temperature also gradually rises.

In this case, since the load is large, the room temperature doesn't reach the OFF point of the thermostat soon. As was previously mentioned in in connection with the control procedure, the defrosting control doesn't function for a constant period of time after the start of the operation because of the defrosting inhibition time $T_1$.

After the elaspe of the time $T_1$, the preparation control for defrosting, namely, the operation detecting time $T_2$, functions to determine whether the compressor is operating or not. In this case, since the room temperature is below the OFF point of the thermostat, the refrigerating cycle system is not influenced by the function of the operation detecting time $T_2$. The inlet pipe temperature is also simultaneously monitored.

With the elapse of the operating time, when the frost is deposited onto the outdoor heat exchanger, the inlet pipe temperature gradually decreases in proportional to the degree of deposition of the frost and soon becomes lower than the set value $t_1$ as the reference value to determine the necessity of the defrosting operation. Thus, the low-level time $T_3$ functions and a check is made to see if the time $T_3$ has continued for a time longer than the set time or not.

If YES, the control apparatus operates the four-way valve of the refrigerating cycle and switches from the heating cycle to the defrosting cycle.

Thus, the frost deposited on the outdoor heat exchanger is melted and removed. After the frost is completely removed, the defrosting inhibition time $T_1$ is set, then the heating operation is performed again.

If the power source frequency is 50 Hz, since the inlet pipe temperature varies as indicated by the long-and-short dash line in FIG. 6, the defrosting start temperature $t_1$ is corrected to $t_1'$ as previously described with reference to FIG. 4.

Figure 7:
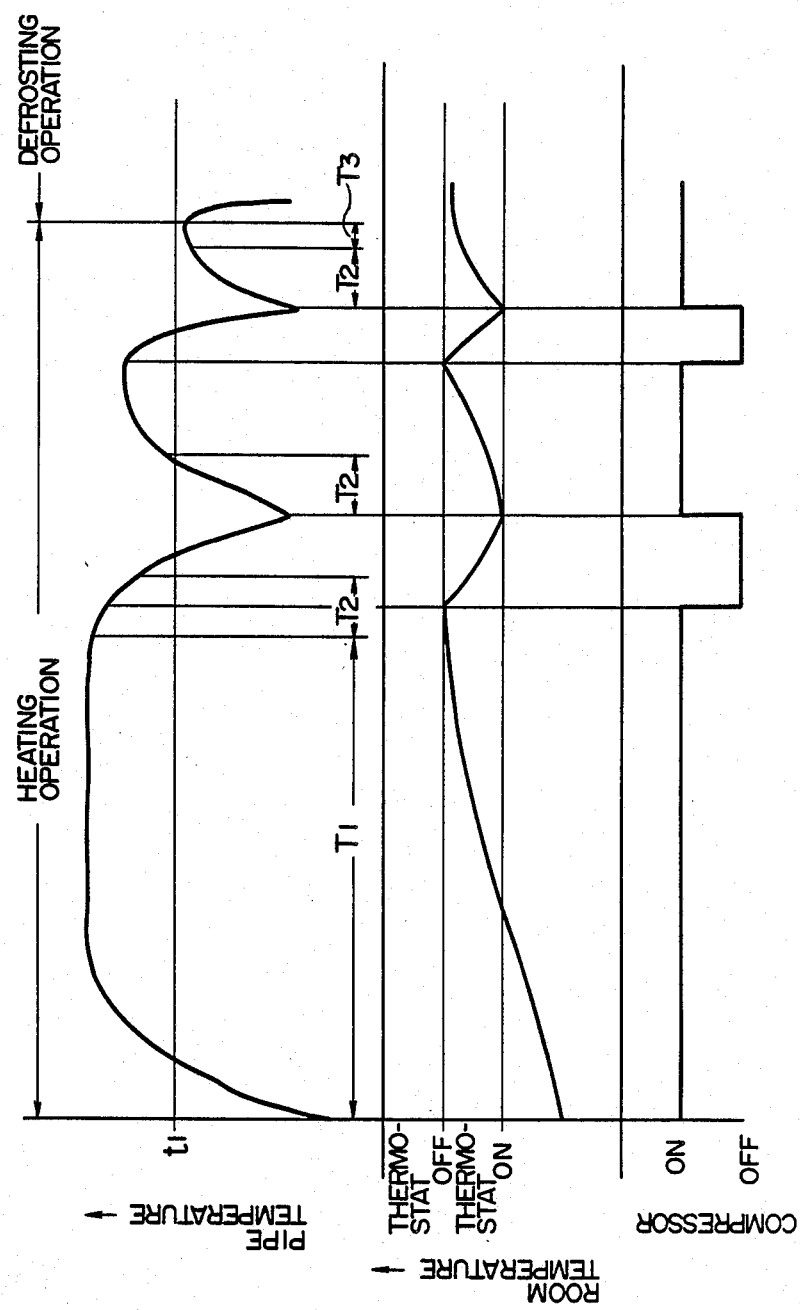
FIG. 7 is a time chart showing an example of the operation when the heating load on the temperature control system is an ordinary load.

FIG. 7 shows the case where the load is an ordinary one (i.e., the outdoor temperature is not so low). It is assumed that the compressor is driven at a power source frequency of 60 Hz.

In this case, the room temperature also gradually increases with the elapse of time from the start of operation. After the defrosting inhibition time $T_1$ passes, the operation detecting time $T_2$ as already described with reference to FIG. 6 functions. The operation detecting time $T_2$ is provided to keep the heating function when the compressor is restarted. However, in this case, the compressor is stopped since the thermostat to control the room temperature preferentially operates. Therefore, the program of the control apparatus is returned to step 7 because the answer in step 8 in FIG. 5 is NO.

When the room temperature reaches the ON point of the thermostat and the compressor is restarted, the operation detecting time $T_2$ functions and the compressor is continuously made operative during this interval. The control apparatus monitors the room temperature but doesn't monitor the inlet pipe temperature until the time $T_2$ elapses. If the room temperature reaches the OFF point of the thermostat within the time $T_2$, the compressor is stopped in a manner similar to the above.

Thereafter, the foregoing room temperature control is repeated and the heating operation is executed.

When the frost is eventually deposited onto the outdoor heat exchanger, the compressor is continuously driven within the operation detecting time $T_2$ when it is restarted. However, after the expiration of the time $T_2$, the inlet pipe temperature is immediately checked.

In this case, since the inlet pipe temperature is lower than the set value $t_1$, the processes from steps 10 to 14 in FIG. 5 are executed. Namely, if the state in which the inlet pipe temperature is lower than the set value $t_1$ continues for the low-level time $T_3$, it is determined that the frost is deposited onto the outdoor heat exchanger, so that the defrosting operation is carried out as described with reference to FIG. 5.

Figure 8:
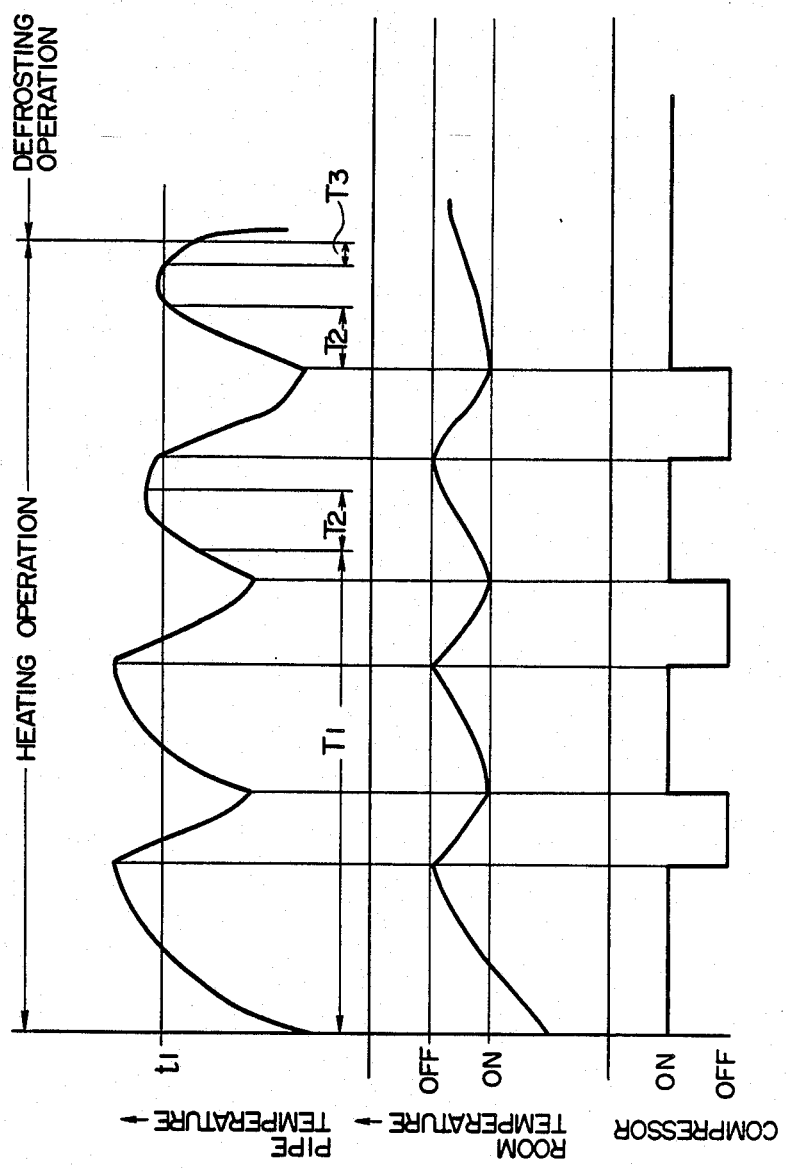
FIG. 8 is a time chart showing an example of the operation when the heating load on the temperature control system is relatively small.

FIG. 8 shows the case where the load is relatively small (i.e., the outdoor temperature is high). It is assumed that the compressor is driven at a power source frequency of 60 Hz similarly to the above.

In this case, the room temperature also rises with the elapse of the time after the start of the operation and the ON/OFF operations of the compressor are repeated several times within the defrosting inhibition time $T_1$ in order to control the room temperature.

After the elapse of the defrosting inhibition time $T_1$, the operation detecting time immediately functions. Thereafter, the inlet pipe temperature is monitored.

After the elapse of the defrosting inhibition time $T_1$ mentioned above, the control is executed in a manner similar to FIG. 7. When the inlet pipe temperature becomes lower than the set value $t_1$, the low-level time $T_3$ when this state continues is measured. With the expiration of the time $T_3$, the defrosting operation is executed.

Further, in FIGS. 6 to 8, the execution of the defrosting operation is determined only after the expiration of the time $T_3$ when the inlet pipe temperature is continuously lower than the set value $t_1$. Therefore, even if the detection signal of the inlet pipe temperature instantaneously becomes lower than the set value $t_1$ due to the external noise and the like, the defrosting operation is not performed.

Namely, an unnecessary defrosting operation because of erroneous detection, and the interruption of the heating operation due to this defrosting operation, are prevented.

In the above embodiment, the defrosting operation is performed by switching from the heating cycle to the refrigerating cycle. However, it is also possible to proceed in a manner such that, for example, a refrigerant whose heat was separately accumulated in the outdoor heat exchanger is allowed to flow with the heating cycle maintained, or in a manner such that the frost is melted by another heat source. On the other hand, in the case of switching to the defrosting operation, the compressor 1 may be continuously driven and then temporarily stopped before the operating mode is returned to the heating operation.

Each of the set times until the defrosting operation is started is not limited to those in the embodiment but may be arbitrarily set.

Further, the output level of the port $P_{21}$ according to the power source frequency may be set to "Hi" when the frequency is 50 Hz and the set value may be changed.

As described above, according to the invention, with the foregoing constitution, the temperature of the refrigerant gas in the overheat range is detected at the inlet pipe of the indoor heat exchanger. By merely detecting the temperature at a single position, the proper defrosting operation can be executed while performing a correction on the basis of the power source frequency without being largely influenced by the all velocity in the room. The arrangement is very simple. In addition, on the inlet side of the indoor heat exchanger, it is possible to determine whether the refrigerant has a large enough amount of heat or not. Therefore, the presence or absence of sufficient heating capability can be determined with certainty and the defrosting operation can be executed. Namely, according to the invention, attention is paid to the points that there is no difference between the temperatures of refrigerant in the inlet and middle portions of the heat exchanger onto which the frost is completely deposited and the temperature of refrigerant in the inlet is remarkably higher than that in the middle portion when no frost is deposited onto the heat exchanger. By detecting the refrigerant temperature on the inlet side, a large temperature change from the state of no frost deposition to the state with frost deposition can be assured. The heating capability near the limit can be fully effected by the detection of the temperature at a single position. In addition, according to the invention, the deposition of frost is not detected until a constant time elapses from the start of the heating operation due to turning the operation start switch on and from the start of the heating operation after the end of the defrosting operation. Therefore, the heating capability is held for this constant time interval and comfortableness is not lost.

In addition, according to the invention, during the heating operation, the deposition of the frost is not detected until a constant time elapses from the restart operation after the compressor was once stopped. This prevents the pipe temperature of the indoor heat exchanger from being detected while it is increasing and the defrosting operation from being erroneously started despite the absence of deposited frost, for example, just after the compressor is operated again after the thermostat is off or the like.

Further, the defrosting operation is started only when the pipe temperature of the indoor heat exchanger is continuously lower than the set temperature. This prevents the defrosting operation from being erroneously started by detecting a pipe temperature lower than the actual pipe temperature because of external noise and the like. Furthermore the deposition of frost can be detected with certainty, and the defrosting can be performed with high reliability and without malfunction.

What we claim is:

1. A defrosting control apparatus for use with a temperature control system having a compressor, an indoor heat exchanger with an inlet pipe, an expansion device, an outdoor heat exchanger, and cycle switching means for switching between a heating cycle and a defrosting cycle, said defrosting control apparatus controlling said cycle switching means and comprising:

temperature detecting means for detecting the temperature of a refrigerant at the inlet pipe of said indoor heat exchanger;

set temperature memory means for providing a boundary value temperature at which the heating cycle is to be switched to the defrosting cycle;

temperature comparing means for detecting whether the temperature detected by said temperature detecting means is lower than said boundary value temperature provided by said set temperature memory means and for outputting the result of the detection;

time measuring means for measuring a time corresponding to how long the temperature detected by the temperature detecting means has been lower than the boundary value temperature provided by the set temperature storing means;

set time memory means for storing a predetermined low-level time;

time comparing means for detecting a coincidence between said time detected by said time measuring means and the low-level time set in said set time memory means and for outputting the result of the detection;

determining means for generating an output which determines when to switch from the heating cycle to the defrosting cycle on the basis of the output of said time comparing means and the output of said temperature comparing means; and selection output means for controlling said cycle switching means to switch from the heating operation to the defrosting operation in response to the output of said determining means.

2. A defrosting control apparatus according to claim 1, wherein the temperature control system includes a heating operation switch, further comprising operating time detecting means for measuring the elapsed time after the heating operation switch has been turned on or a prior defrosting operation has been completed, and wherein said determining means is made operative so that switching from the heating cycle to the defrosting cycle can be performed after the time measured by the operating time detecting means exceeds a predetermined defrost inhibition time.

3. A defrosting control apparatus according to claim 1, further comprising operation detecting means for measuring the elapsed time from a restarting of the compressor, and wherein said determining means is made operative so that switching from the heating cycle to the defrosting cycle can be performed after the time measured by the operation detecting means exceeds a predetermined operation detecting time.

4. A defrosting control apparatus according to claim 2, further comprising operation detecting means for measuring the elapsed time after the end of said defrosting inhibition time or the restarting of the compressor, and wherein said determining means is made operative so that switching from the heating cycle to the defrosting cycle can be performed after the time measured by the operation detecting means exceeds a predetermined operation detecting time.

5. A defrosting control apparatus for a temperature control system having a heating operation switch, a compressor, an indoor heat exchanger, an expansion device, an outdoor heat exchanger with an inlet pipe, and cycle switching means for switching between a heating cycle and a defrosting cycle, said defrosting control apparatus controlling said cycle switching means and comprising:

temperature detecting means for detecting the temperature of a refrigerant at the inlet pipe of said indoor heat exchanger;

set temperature memory means for providing a boundary value temperature at which the heating cycle is to be switched to the defrosting cycle;

frequency input means for outputting a signal corresponding to a power source frequency;

frequency discriminating means for determining the frequency of the power source on the basis of an output from said frequency input means;

boundary value temperature switching means for switching the boundary value temperature of said set temperature memory means on the basis of an output signal from said frequency discriminating means;

temperature comparing means for detecting whether the temperature detected by said temperature detecting means is lower than the boundary value temperature provided by said set temperature means and for outputting the result of the detection;

operation time detecting means for measuring the elapsed time after the heating operation switch has been turned on or a prior defrosting operation has been completed;

set time memory means for storing a predetermined defrosting inhibition time;

time comparing means for detecting a coincidence between said defrosting inhibition time and the time measured by said operation time detecting means and for outputting the result of the detection;

determining means, respectively receiving the boundary value signal from said temperature comparing means and an output from said time comparing means, for generating an output which determines when to switch from the heating cycle to the defrosting cycle; and selection output means for controlling said cycle switching means to switch from the heating operation to the defrosting operation in response to the output of said determining means.

6. A defrosting control apparatus according to claim 5, further comprising continuous output time detecting means, responsive to the output from said temperature comparing means, for determining how long the temperature detected by the temperature detecting means has continuously been lower than the boundary value temperature and wherein said determining means is made operative so that switching from the heating cycle to the defrosting cycle can be performed after the time determined by the continuous output time detecting means exceeds a predetermined low-level time.

7. A defrosting control apparatus for a temperature control system having a heating operation switch, a compressor, an indoor heat exchanger with an inlet pipe, an expansion device, an outdoor heat exchanger, and cycle switching means for switching between a heating cycle and a defrosting cycle, said defrosting control apparatus controlling the cycle switching means and comprising:

operating time detecting means for detecting the elapse of a predetermined defrosting inhibition time after the heating operation switch has been turned on or a prior defrosting operation has been completed and for outputting the result of the detection;

compressor operation detecting means for determining whether or not said compressor has operated continuously for a predetermined operation detecting time subsequent to the elapse of the defrosting inhibition time detected by said operation time detecting means or subsequent to a restarting of the compressor after the elapse of said defrosting inhibition time;

temperature detecting means for detecting the temperature of a refrigerant at the inlet pipe of said indoor heat exchanger;

set temperature memory means for providing a boundary value temperature at which the heating cycle is to be switched to the defrosting cycle;

frequency input means for outputting a signal corresponding to a power source frequency;

frequency discriminating means for determining whether the input frequency from said frequency input means is 50 Hz or 60 Hz;

boundary value temperature switching means for switching said boundary value temperature of said set temperature memory means in response to said frequency discriminating means;

temperature discriminating means for detecting whether the temperature detected by said temperature detecting means is lower than the boundary value temperature provided by the set temperature memory means and for outputting the result of the detection;

continuous output time detecting means for detecting whether the boundary value temperature has continuously been greater than the temperature detected by said temperature discriminating means for a time longer than a predetermined low-level time and for outputting the result of the detection;

operation detecting means, responsive to the continuous output time detecting means, for detecting whether the compressor is operating when said boundary value temperature has continuously been greater than the temperature detected by the temperature discriminating means for a time longer than the low-level time and for outputting the result of the detection;

determining means, receiving the outputs from said operation time detecting means, compressor operation detecting means, temperature discriminating means, continuous output time detecting means, and operation detecting means, for generating an output which determines whether the temperature control system is to be set into the heating cycle or the defrosting cycle; and output means for driving said cycle switching means in response to the output of said determining means, wherein the heating cycle is switched to the defrosting cycle by said cycle switching means when it is detected by said compressor operation detecting means that the compressor has operated continuously for the operation detecting time after the elapse of the defrost inhibition time, and when it is detected by said continuous output time detecting means that said boundary value temperature, in accordance with the power source frequency, has continuously been greater than the temperature detected by said temperature discriminating means for a time longer than the low-level time.

* * * * *